Figure 1:
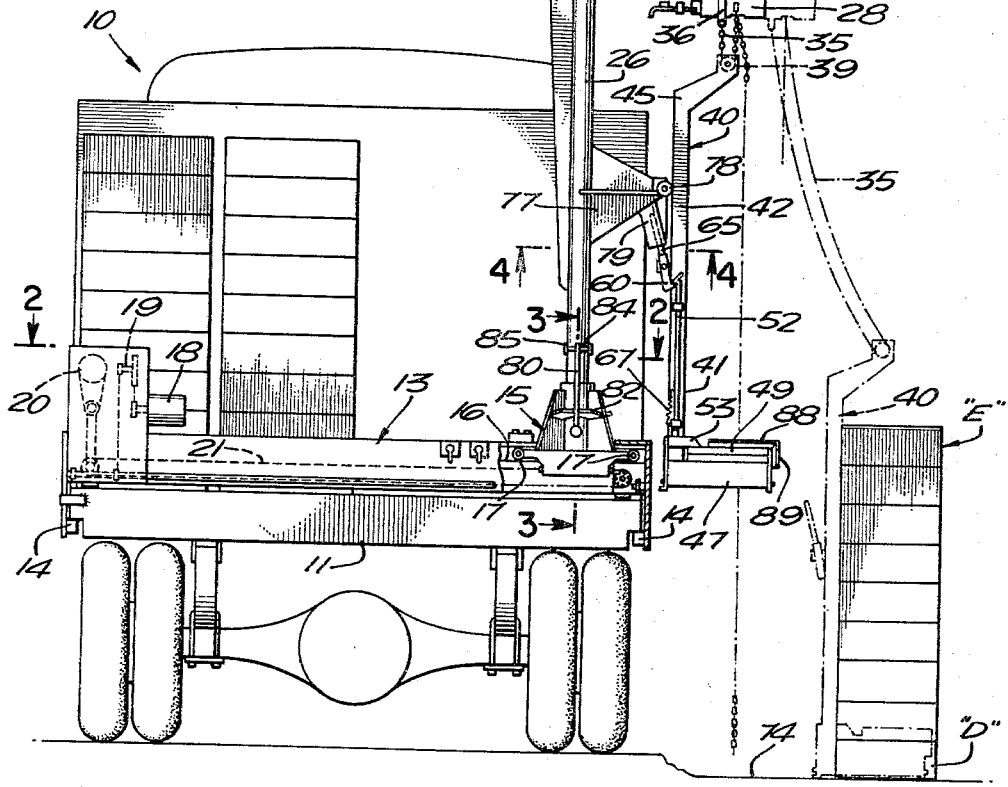

April 6, 1965  L. A. PAUL ETAL  3,176,861
TRUCK MOUNTED BOX LOADER
Filed Sept. 19, 1961  3 Sheets-Sheet 1

INVENTORS.
LOWELL A. PAUL
LOYD ADAMS
TYLER S. McDONALD
BY
ATTORNEYS.

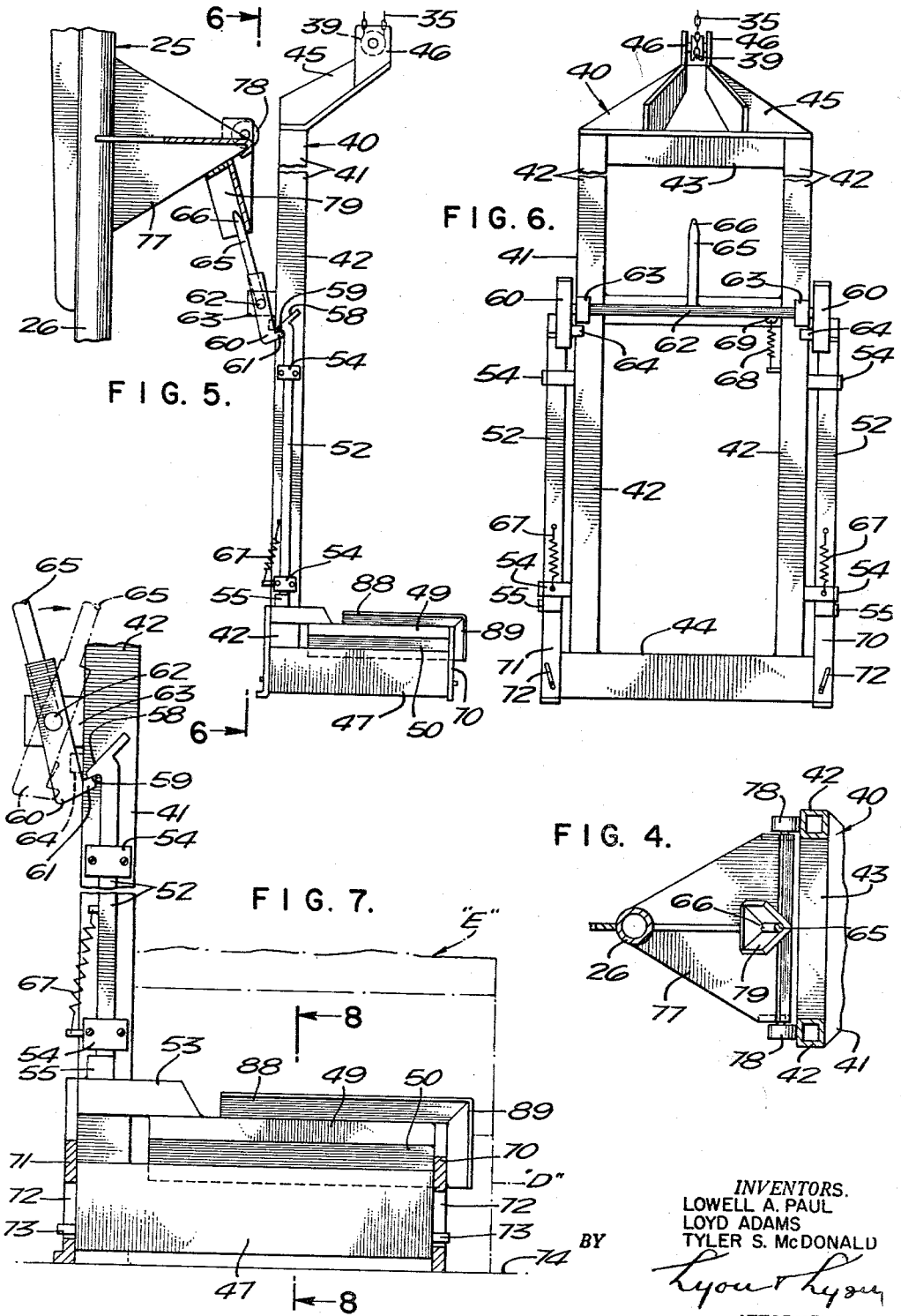

April 6, 1965
L. A. PAUL ETAL
3,176,861
TRUCK MOUNTED BOX LOADER
Filed Sept. 19, 1961
3 Sheets-Sheet 3
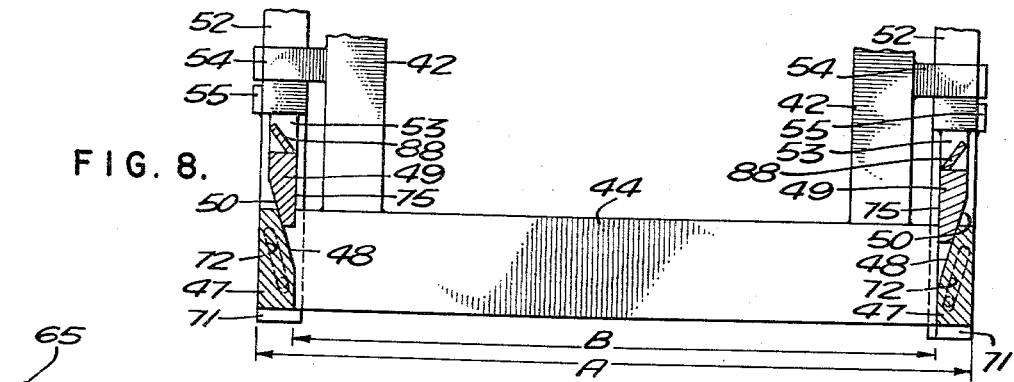
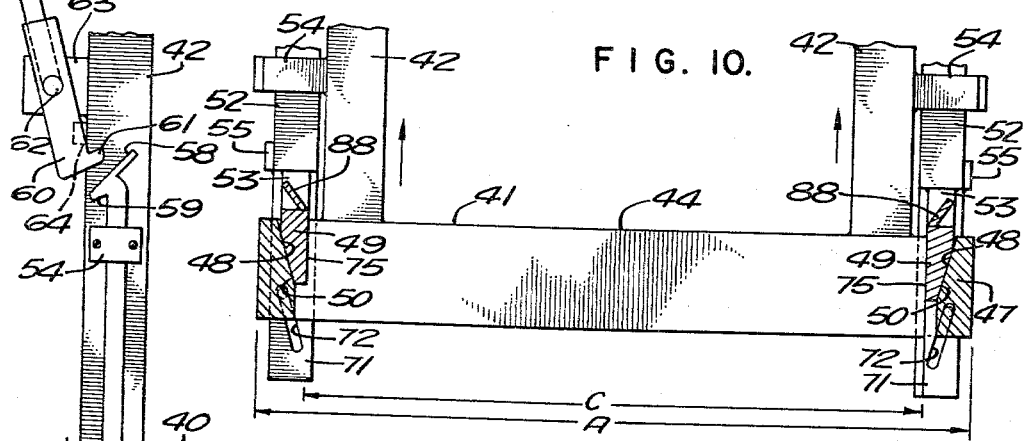
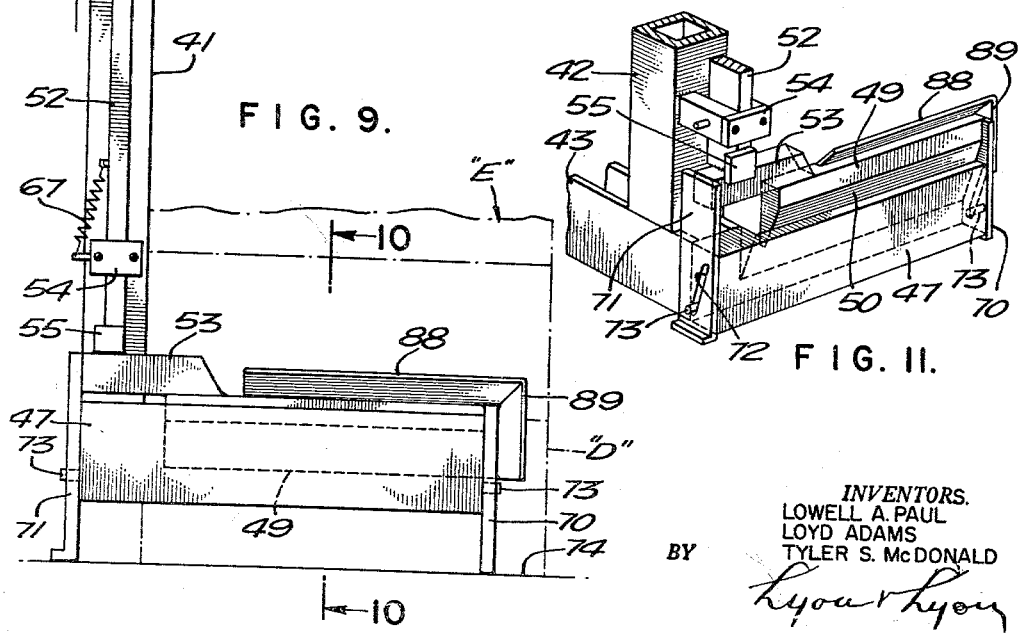
INVENTORS.
LOWELL A. PAUL
LOYD ADAMS
TYLER S. McDONALD
BY
Lyon & Lyon
ATTORNEYS.

United States Patent Office 3,176,861
Patented Apr. 6, 1965

3,176,861
TRUCK MOUNTED BOX LOADER
Lowell A. Paul and Loyd Adams, Pasadena, and Tyler S. McDonald, Escondido, Calif., assignors to Calavo Growers of California, Los Angeles, Calif., a corporation of California
Filed Sept. 19, 1961, Ser. No. 139,275
7 Claims. (Cl. 214—75)

This invention relates to loading and stacking and box-handling apparatus and is particularly directed to a mobile device for lifting a stack of loaded boxes and placing them in selected position on a mobile platform such as the bed of the truck. This invention will be described in connection with loading, stacking, and unloading of boxes filled with fruit, although it is to be understood that this is by way of illustration and not of limitation.

In the conventional method of transporting loaded fruit boxes from an orchard, it is customary after picking the fruit and placing it in boxes to stack the boxes at intervals along roadways through the orchard so that the boxes may be manually loaded onto the bed of a truck. This is often heavy, disagreeable work, performed in open sun and often involves undue jostling and shock loading to the boxes and fruit with attendant bruising or other damage to the fruit. Moreover, several workers are required, in addition to the truck driver, for loading the stacked boxes of fruit and the labor costs for bringing the fruit from the orchard is considerable.

Accordingly, it is an important object of this invention to provide a mechanical power-operated device to enable a single worker to drive a highway vehicle such as a truck alongside a group of loaded boxes stacked on the ground and by means of the power-operated hoist on the device to lift each entire stack as a unit and place it in a desired position on the bed of the truck.

Another object is to provide such a device which handles the loaded fruit boxes gently with a minimum of shock loading to minimize bruise damage to the fruit.

Another object is to provide a device of this general type which accommodates uneven ground, tilt of the truck, and misalignment of the hoist apparatus and the stack of loaded boxes.

Another object is to provide an improved form of stack carrier having automatic gripping elements for stacking of loaded boxes.

Another object is to provide such a device having means to orient the stack carrier with respect to the truck bed.

Another object is to provide a stack carrier employing wedge grip elements which move laterally when gripping but which do not increase overall lateral width when releasing, to facilitate close positioning of loaded stacks of boxes on the truck bed.

A more detailed object is to provide a device of this type which employs centralized controls so that a single operator may control all of the operations of the apparatus and without requiring him to climb up onto the truck bed.

Other and more detailed objects and advantages will appear hereinafter.

Generally stated, the device of this invention includes a carriage which extends transversely of a truck bed and rolls therealong in a longitudinal direction. A travelling support is mounted to move along the carriage laterally of the truck bed. A jib crane is mounted to turn on the travelling support, and carries a power hoist from which a stack carrier is suspended. The suspended stack carrier is provided with wedge grip devices which straddle the lowermost box in a stack of loaded boxes resting on the ground. When the hoist is energized to lift the stack, the wedge grips operate automatically. When the stack reaches a predetermined height, automatic engagement between the stack carrier and the jib crane takes place so that the jib crane and stack of boxes may be turned as a unit. The carriage is then rolled along the truck bed to the desired longitudinal position and the jib crane is moved laterally of the truck bed along the carriage until the desired stacking position is reached. The hoist is then operated to lower the stack of boxes and the wedge grip devices automatically release when certain parts on the stack carrier contact the truck bed. The procedure described may be repeated until the truck bed is fully loaded, and the same apparatus may be later used for removing the loaded boxes from the truck bed, one stack at a time.

Figures 2, 3:
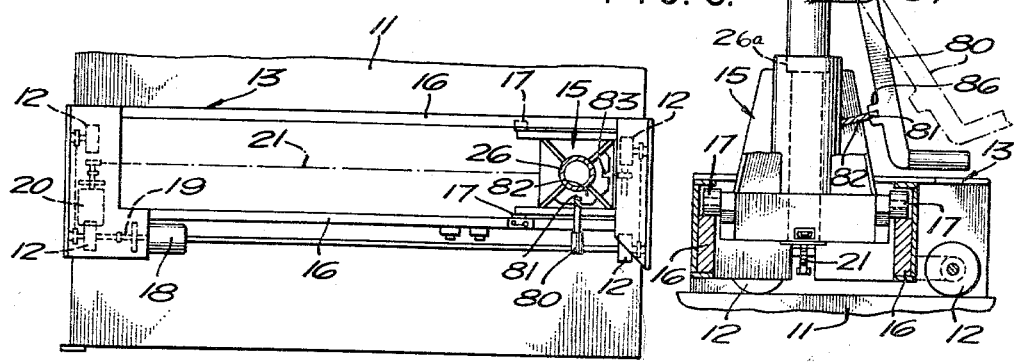

In the drawings:
FIGURE 1 is an elevation showing a preferred embodiment of this invention mounted on the bed of a truck.
FIGURE 2 is a plan view partly in section, taken substantially on the lines 2—2 as shown in FIGURE 1.
FIGURE 3 is a sectional detail, partly broken away, taken substantially on the lines 3—3 as shown in FIGURE 1.
FIGURE 4 is a sectional detail, taken substantially on the lines 4—4 as shown in FIGURE 1.
FIGURE 5 is a side elevation, partly broken away, showing the stack carrier on an enlarged scale.
FIGURE 6 is an elevation taken substantially on the lines 6—6 as shown in FIGURE 5.
FIGURE 7 is a side elevation of the lower portion of FIGURE 5, the wedge parts being shown in release position.
FIGURE 8 is a sectional elevation taken substantially on the lines 8—8 as shown in FIGURE 7.
FIGURE 9 is a view similar to FIGURE 7 showing the parts in gripping position.
FIGURE 10 is a sectional view taken substantially on the lines 10—10 as shown in FIGURE 9.
FIGURE 11 is a perspective view showing one of the rear lower corners of the stack carrier.

Proceeding to a more detailed description of the parts of the apparatus, the truck generally designated 10 is provided with the usual bed 11 and upon the lateral edges of this bed are mounted rollers 12 which support the carriage 13. Additional rollers 14 are mounted on the carriage 13 and underlie the lateral edges of the truck bed to prevent tilting or tipping of the carriage.

A trolley or moving support 15 is mounted to roll on the carriage 13 and as shown in the drawings parallel tracks 16 are provided on the carriage 13. Rollers 17 on the support 15 roll along the tracks 16. A motor 18 mounted on the carriage 13 drives through a speed reduction drive 19 to turn the carriage rollers 12 in either direction. Similarly, another motor 20 drives through suitable transmission connections to move the chain 21 and thus move the support 15 in either direction along the carriage tracks 16.

A jib crane generally designated 25 is rotatably mounted on the support 15. This jib crane includes a vertical mast or post 26 having a laterally projecting arm or boom 27 at its upper end. A thrust bearing assembly 26a mounts the post on the support 15.

A power driven hoist 28 is carried on the boom 27 and is preferably mounted for longitudinal movement thereon. Rollers 29 are mounted on the hoist and they roll on tracks 30 provided on the boom 27. A power cylinder assembly 30 is also mounted on the boom 27 and has a piston rod 31 connected at 32 to the hoist body. Extension or retraction of the piston rod 31 serves to move the hoist 28 outward or inward along the boom 27. The hoist 28 is of conventional construction and is preferably air operated. A chain 35 has one end attached by bracket 36 to the hoist body and has an intermediate portion thereof passing over a drive roller (not shown) on the hoist 28. The chain passes under a support pulley 39 provided on the upper end of a stack carrier 40.

The stack carrier 40 comprises a frame 41 which includes a pair of vertical side members 42 connected at opposite ends by horizontal cross members 43 and 44. The inclined member 45 is fixed to the upright members 42 and to the horizontal cross member 43 and carries the pulley support members 46. At the lower end of each upright member 42 is fixed a horizontally projecting foot member 47. These foot members 47 are parallel and are rigid with the frame 41. Their maximum overall width is shown by the dimension A in FIGURES 8 and 10. Each of these foot members 47 is provided with an upward flaring tapered surface 48 on an inner face thereof. Vertically movable horizontally extending wedges 49 are provided with tapered faces 50 which cooperate with the inclined surfaces 48 on the foot members 47. When these vertically movable wedges 49 are in their upper position, as shown in FIGURE 8, a maximum clearance dimension B exists between them. When these wedges 49 are in their lowest position with respect to the foot members 47 the maximum clearance dimension between them is indicated at C. The dimension C is less than the dimension B. In the general plan of operation, the frame 41 is swung to position the foot members 47 to straddle the lowermost box D in a stack E. The wedges 49 are caused to move inward by relative motion with respect to the foot members 47 and this inward motion serves to grip the sides of the lowermost box D.

Means are provided for causing automatic gripping motion of the wedges 49 and as shown in the drawings this means includes parallel upright bars 52 connected to the horizontal wedges 49 by means of intermediate welded connecting parts 53. Upward motion of the parallel bars 52 lifts the wedges 49 away from the horizontal foot members 47 and thereby permits them to move laterally outward from the gripping position shown in FIGURE 8 to the release position shown in FIGURE 8. Stationary guides 54 are provided on the slide members 42 for guiding the bars 52. A stop element 55 at the lower end of each bar 52 engages one of the guides 54 to limit upward movement of the rod. The upper end of each bar 52 is provided with an inclined surface 58 and an undercut shoulder 59. Triggers 60 each having a head portion 61 adapted to underlie the shoulders 59 are fixed to opposite ends of a pivot rod 62. This rod 62 is mounted to turn in bearings 63 fixed on the back side of the upright members 42. Each trigger 60 carries a lug 64 which engages the adjacent upright member 42 to limit pivotal movement of the trigger in one direction.

An upward extending lever 65 is fixed centrally of the pivot rod 62 and is provided with a pointed upper end 66. From this description it will be understood that when the stack carrier 40 is suspended from the chain 35 in a position above the ground or other support and when the pivot rod 62 is turned to the phantom line position shown in FIGURE 7, the rods 52 and their attached wedges 49 descend by gravity aided by means of the coil springs 67. A spring 68 extends from one of the upright members 42 to a lug 69 fixed to the pivot rod 62 and acts to turn the pivot rod toward the full line position shown in FIGURE 7.

An end member 70 is fixed to the projecting forward end of each of the wedges 49 and slides relative to the forward end of the associated foot member 47. Similarly, an end member 71 is fixed relative to the connecting part 53 and slidably engages the rearward end of the same foot member 47. Each of these end members 70 and 71 is provided with an angle slot 72 which receives a pin 73 fixed to the end member 47. The angularity of the slot is the same as the inclination of the wedge surfaces 48 and 50, as shown in FIGURES 8 and 10. The pins 73 serve to afford guide means for motion of the wedges 49 along the wedge surfaces 48.

The action of the wedges 49 in gripping the lowermost box D in a stack E is as follows: The stack carrier 40 is lowered by means of the chain 35 and the frame 41 is maneuvered to position the foot member 47 to straddle the lowermost box D. The triggers 60 are in the latched position as shown in FIGURE 7 and this holds the wedges 49 in the upper position as shown in FIGURE 8. At or about the time that the end members 71 and 72 strike the ground surface 74, the lever 65 is swung in the direction of the arrow to the phantom line position shown in FIGURE 7, thereby releasing the triggers 60 from the inclined shoulders 59. The power driven hoist 28 is then operated to cause the chain 35 to lift the stack carrier 40, and this causes upward movement of the frame 41 and the horizontal foot members 47. The surfaces 75 on the wedges 49 frictionally grip the lowermost box D by wedging action and the weight of the stack E is then transferred to these wedges 49 and thence to the horizontal foot members 47. Continued upward motion of the frame 41 serves to lift the stack from the ground surface 74. During this lifting movement the triggers 60 remain disengaged from the shoulders 59 at the upper ends of the bars 52.

Means are provided for aligning the stack carrier 40 and its stack E of loaded boxes with respect to the jib crane 25, and as shown in FIGURES 4 and 5 of the drawings this means includes a bracket 77 fixed to the post 26 and provided with a pair of laterally spaced rollers 78 adapted to contact the parallel upright members 42 of the frame 41. An aligning socket 79 is fixed on the bracket 77 and is open at the bottom to receive the upper pointed end 66 of the lever 65. The weight of the loaded boxes in the stack E tends to maintain the stack carrier 40 in upright position so that the operator standing at the ground level has no difficulty in causing the lever 65 to enter the receptacle 79 as the stack carrier 41 moves upward and laterally into contact with the roller 78. The stack carrier 40 is shown in its highest operating position in FIGURE 1 and in this position the lowermost parts of the stack carrier are above the level of the bed 11 of the truck 10.

During the operation of lifting the stack E from the ground level to the position of the stack carrier 40 as shown in FIGURE 1, the jib crane 25 remains in the position illustrated in FIGURE 1 because of the engagement of the swinging lever 80 with the notch 81 provided on the plate 82. The plate 82 is fixed on the support 15 and is provided with a second notch 83 at right angles to the first notch 81. The lever 80 is pivoted at 84 to a pair of ears 85 fixed on the post 26. The lever 80 may be manually swung to the phantom line position shown in FIGURE 3 in order to bring its lug 86 clear of the plate 82 and its notches. Having released the lug 86 from the notch 81 the operator swings the lever 80 through 90°, thereby causing the jib crane 25 to swing through one quarter revolution. The stack carrier 40 and its stack of boxes turn as a unit with the jib crane because of the contact with the rollers 78 and the interengagement of the lever 65 within the receptacle 79. Having manually turned the jib crane 25 and loaded stack carrier 40 through one quarter revolution, the operator then lowers the swinging lever 80 to bring the lug 86 into engagement with the notch 83, thereby locking the jib crane 25 in its new position. The operator then energizes the motors 18 and 20 to cause movement of the carriage 13 along the bed of the truck 10 as well as to cause lateral movement of the support 15 with respect to the truck bed 11. The loaded stack E is then deposited at a desired position on the truck bed 11 adjacent to one of the other stacks previously deposited.

When the lower ends of the end members 70 and 71 rest upon the truck bed 11, further downward movement of the frame 41 by action of the hoist 28 and chain 35 cause the foot members 47 on the frame 41 to descend from the position shown in FIGURE 9 to the release position shown in FIGURE 7. The upper inclined surfaces 58 on the upper ends of the bars 52 engage the lower portions of the heads 61 on the trigger 60 and cause them to swing aside and to return under the inclined shoulders 59 under action of the spring 68. The triggers 60 thus automatically re-engage the shoulders 59 when the stack carrier is rested on the truck bed. This is to be contrasted to the operation when the operator initially engages the stack carrier 40 with the stack E resting on the ground surface, since in the latter case the operator manually holds the lever 65 in position to prevent engagement of the trigger 60 with the inclined shoulders 59 until after the weight of the stack is applied to the wedges 49.

Upon subsequent lifting of the stack carrier 40 after depositing the loaded stack E on the truck bed 11, the trigger 60 acting on the bars 62 maintains the wedges 49 in the upper position as shown in FIGURE 8. The clearance distance B between the wedge faces 75 is greater than the width of the boxes. It will be noted that the internal width of the gripping elements is less when released than it is when engaged, since the dimension B is greater than the dimension C. The outside dimension A remains the same in all cases. Accordingly, no difficulty is experienced in removing the stack carrier 40 from the stack of boxes resting on the truck bed and no binding occurs with an adjacent stack previously deposited. If desired, angled fender elements 88 and 89 may be provided on each of the wedges 49 to facilitate entry and exit of boxes without gouging or binding.

In operation the truck 10 is driven along a roadway through the orchard until it comes to a stack of loaded boxes resting on the ground. The truck driver stops the truck, descends to the ground, and walks to a position adjacent the right hand side of the truck bed 11. All of the controls for the loading device are positioned at a centralized location on the carriage 13 adjacent the right hand end thereof as shown in FIGURE 1. The controls are not shown in the drawings. Electrically operated valves are preferably employed for controlling the delivery of air under pressure to the hoist 28. The operator swings the jib crane 25 by means of the swinging lever 80 and latches it in the notch 81. He then operates the hoist 28 to cause it to lower the stack carrier 40 to a position adjacent the stack E. He also operates suitable controls, if necessary, to move the hoist 28 laterally on the boom 27 by means of power cylinder 30. He then moves the lever 66 to disengage the triggers 60 from the upper ends of the bars 52.

The weight distribution of the unloaded stack carrier 40 is such that the lower ends of the upright members 42 tend to swing under the pulley 39. This action automatically tilts the forward extending ends of the leg members 47, thereby facilitating the placement of the stack carrier in position to cause the leg members 47 to straddle the lowermost box D. The operator pushes the frame 41 to cause the upright members 42 to engage one side of the boxes in the stack E, and while holding the lever 65 inward to prevent engagement of the triggers 60, he actuates the hoist 28 to cause the chain 35 to lift the stack carrier 40. This action automatically causes engagement of the wedges 49 with the lowermost D, as described in detail above.

The operator continues the lifting operation and brings the stack carrier into position as shown in FIGURE 1 with the side members 42 in an engagement with the rollers 78 on the bracket 77, and with the inclined lever 66 engaged within the receptacle 79. The operator then uses the swinging lever 80 to turn the jib crane 35 and loaded stack carrier 40 through one quarter revolution, thereby swinging the stack E over the bed 11 of the truck 10.

Suitable operation of the motors 18 and 20 causes movement of the carriage 13 along the truck bed and causes movement of the support 15 along the rail 16 of the carriage 13. When the stack E has been brought to the desired position relative to the other stacks previously loaded onto the truck bed, the operator actuates the hoist 28 to cause it to lower the stack carrier 40. This results in automatic engagement with triggers 60 with the inclined shoulders 59 at the upper ends of the bars 52, and thereby holds the wedges 49 in their upper retracted position, so that subsequent upward movement of the stack carrier takes place without moving the stack just deposited. The operator then repeats the operation to load any additional stacks and then returns to the cab of the truck and drives through the orchard to the next location where stacks of boxes are to be loaded.

The width of the carriage 13 is approximately equal to the width of one of the boxes D and accordingly the presence of the carrier on the bed of the truck takes up space equal to only one row of stacks of boxes. The carriage can be operated to load the truck from either the front end of the bed or from the rear end thereof, as desired. The device may also be used for unloading the stacks of boxes when the truck arrives at the packing house. In this situation two men are normally required to operate the device since one remains at the controls which are positioned near one end of the carriage 13, while the other man standing on the truck bed operates the lever 65 and assists in aligning the stack carrier with the stacks of boxes on the truck bed.

Having fully described our invention, it is to be understood that we are not to be limited to the details herein set forth, but that our invention is of the full scope of the appended claims.

We claim:

1. In a device of the class described, the combination of: a carriage adapted to move longitudinally, guide means on the carriage extending transversely to the direction of movement of the carriage, a support member mounted to move on said guide means, a jib crane including a post rotatably mounted on said support member and including a boom extending laterally from said post, a power driven hoist carried on the boom, a stack carrier suspended from the hoist for engaging a stack of loaded boxes, and means for engaging the stack carrier with said post when the stack carrier is elevated by the hoist to enable the post, stack carrier and stack of loaded boxes to turn as a unit.

2. In a device of the class described, the combination of: a carriage adapted to move longitudinally, guide means on the carriage extending transversely to the direction of movement of the carriage, a support member mounted to move on said guide means, means for moving the support member along said guide means, a jib crane including a post rotatably mounted on said support member and including a boom extending laterally from said post, a power driven hoist carried on the boom, a stack carrier suspended from the hoist for engaging a stack of loaded boxes, and means for releasably attaching the stack carrier to said post when the stack carrier is elevated by the hoist to enable the post, stack carrier and stack of loaded boxes to turn as a unit, and means for turning said post.

3. In a device of the class described, the combination of: a carriage adapted to move longitudinally, guide means on the carriage extending transversely to the direction of movement of the carriage, a support member mounted to move on said guide means, a jib crane including a post rotatably mounted on said support member and including a boom extending laterally from said post, a power driven hoist, means supporting the hoist for movement along said boom, a stack carrier suspended from the hoist for engaging a stack of loaded boxes, and means for releasably attaching the stack carrier to said post when the stack carrier is elevated by the hoist to enable the post, stack carrier and stack of loaded boxes to turn as a unit.

4. In a device of the class described, the combination of: a mobile platform, a carriage mounted to move longitudinally on said platform, guide means on the carriage extending laterally of the platform, a support member mounted on said guide means, a jib crane including a post rotatably mounted on said support member and including a boom extending laterally from said post, a stack carrier, means on said stack carrier for engaging a stack of loaded boxes resting on the ground, means including a power driven hoist carried on said boom for lifting the stack carrier and stack of boxes, means for releasably engaging said stack carrier with said post when the stack carrier is elevated by the hoist, to enable the post, stack carrier and stack of loaded boxes to turn as a unit, and means for turning said post, whereby the stack of boxes may be lifted from the ground and deposited in a predetermined position on said platform.

5. In a device of the class described, the combination of: a mobile platform having parallel longitudinal rails on side edges thereof, a carriage mounted to move along said rails, guide means on the carriage extending laterally of the platform, a support member mounted on said guide means, power means for moving the carriage longitudinally of the platform and for moving said support member along said carriage, a jib crane including a post rotatably mounted on said support member and including a boom extending laterally from said post, a stack carrier, means on said stack carrier for engaging a stack of loaded boxes resting on the ground, means including a power driven hoist carried on said boom for lifting the stack carrier and stack of boxes, means for releasably attaching said stack carrier to said post, when the stack carrier is elevated by the hoist, to enable the post, stack carrier and stack of loaded boxes to turn as a unit, and means for turning said post, whereby the stack of boxes may be lifted from the ground and deposited in a predetermined position on said platform.

6. In a device adapted to be mounted on a truck bed for lifting stacks of loaded boxes from the ground to the truck bed, the combination of: a carriage adapted to be mounted on the truck bed to move longitudinally thereon, guide means on the carriage extending laterally of the truck bed, a support member mounted to move on said guide means, a jib crane including a post rotatably mounted on said support member and including a boom extending laterally from said post, a bracket fixed to said post, a power driven hoist carried on said boom, a stack carrier suspended from said hoist, means on said stack carrier for engaging a stack of loaded boxes resting on the ground, means for turning said post, and means for releasably attaching said stack carrier to said bracket when the stack carrier is elevated by the hoist to enable the post, stack carrier and stack of loaded boxes to turn as a unit.

7. In a device adapted to be mounted on a truck bed for lifting stacks of loaded boxes from the ground to the truck bed, the combination of: a carriage adapted to be mounted on the truck bed to move longitudinally thereon, guide means on the carriage extending laterally of the truck bed, a support member mounted on said guide means, power means for moving the carriage longitudinally of the truck bed and for moving said support member along said carriage, a jib crane including a post rotatably mounted on said support member and including a boom extending laterally from said post, a power driven hoist mounted for movement along said boom, a stack carrier suspended from said hoist, means on said stack carrier for engaging a stack of loaded boxes resting on the ground, means for turning said post, and means for releasably attaching said stack carrier relative to said post when the stack carrier is elevated by the hoist to enable the post, stack carrier and stack of loaded boxes to turn as a unit.

References Cited in the file of this patent
UNITED STATES PATENTS

| | | |
|---|---|---|
| 2,292,870 | Dixon | Aug. 11, 1942 |
| 2,429,193 | Pool et al. | Oct. 14, 1947 |
| 2,558,306 | McIntyre | June 26, 1951 |
| 2,574,131 | Steinbrecher | Nov. 6, 1951 |
| 2,930,499 | Landen | Mar. 29, 1960 |
| 2,998,149 | Bopp | Aug. 29, 1961 |
| 3,036,721 | Neher | May 29, 1962 |